Sept. 1, 1925.

Re. 16,156

R. SUCZEK

METHOD OF AND APPARATUS FOR COMPRESSING FLUID

Original Filed Jan. 6, 1917

INVENTOR.
Robert Suczek
BY Cornelius L. Ehret
his ATTORNEY.

Reissued Sept. 1, 1925. Re. 16,156

UNITED STATES PATENT OFFICE.

ROBERT SUCZEK, OF PHILADELPHIA, PENNSYLVANIA, ASSIGNOR TO C. H. WHEELER MANUFACTURING COMPANY, OF PHILADELPHIA, PENNSYLVANIA, A CORPORATION OF PENNSYLVANIA.

METHOD OF AND APPARATUS FOR COMPRESSING FLUID.

Original No. 1,282,977, dated October 29, 1918, Serial No. 140,901, filed January 6, 1917. Application for reissue filed February 25, 1921. Serial No. 447,875.

*To all whom it may concern:*

Be it known that I, ROBERT SUCZEK, formerly a subject of the Emperor of Austria-Hungary, and now a citizen of the Czechoslovak Republic, residing in the city of Philadelphia, county of Philadelphia, and State of Pennsylvania, have invented certain new and useful Improvements in Methods of and Apparatus for Compressing Fluid, of which the following is a specification.

My invention relates to a method of and apparatus for compressing elastic fluid, such as a gas, vapor, or a mixture of them, and involves the ejector principle in accordance with which an elastic motive fluid, such as steam, is allowed to expand and entrain the fluid to be compressed.

When an elastic fluid is passed through a nozzle it expands and attains high velocity, and the free jet beyond the nozzle will entrain vapor or gas or finely divided solid or liquid material, and the mixture of motive fluid and entrained material is then usually passed through a diffuser in which the mixture undergoes compression and simultaneously diminishes in velocity. Energy is expanded upon the mixture in so compressing it, and the temperature of the mixture rises or is increased, due to the compression.

In accordance with my invention, I chill or cool the mixture while in the diffuser, with the result that the density or weight per unit volume increases, with the result that less energy, and therefore less motive fluid, is required, to compress or raise the pressure of a given amount of gas, vapor or any other material to be entrained to the final desired pressure. In consequence, even in a single stage ejector, economy is effected by the aforementioned cooling.

In a plural stage ejector the cooling is most desirable in connection with the first stage or the earlier stages, but may be employed also in connection with any later stage or stages. Where in a plural stage system cooling in the first stage or the earlier stages is resorted to, the resultant greater density of the mixture as it leaves the first stage or earlier stages passes through a given sized passage or given shaped passage to a later stage with less friction loss in such passage; and in the later stage there results the advantage that the total volume of the mixture of motive fluid from the first stage or earlier stages and entrained gas or vapor to be operated upon by the later stage is the less because of its lower temperature, with the result that in such later stage a smaller amount of motive fluid will be necessary to raise the mixture to a still higher pressure.

And if in a later stage cooling is resorted to while the mixture is undergoing compression there results the advantage also that the amount of motive fluid required for that stage is less than where cooling is not resorted to.

Accordingly, my invention resides in a method of and apparatus for cooling the mixture of motive fluid and entrained fluid in either single or multi-stage apparatus while such mixture is undergoing compression; and my invention resides also in a method of and apparatus for compressing fluid in a plurality of stages by recourse to cooling of the mixture of motive fluid and entrained fluid of an earlier stage while undergoing compression, or immediately thereafter, or both, whereby such mixture upon delivery to a later stage requires in such later stage less motive fluid to effect the desired compression.

For an illustration of some of the forms my invention may take, and for an understanding of my method, reference may be had to the accompanying drawings, in which.

Figure 1:
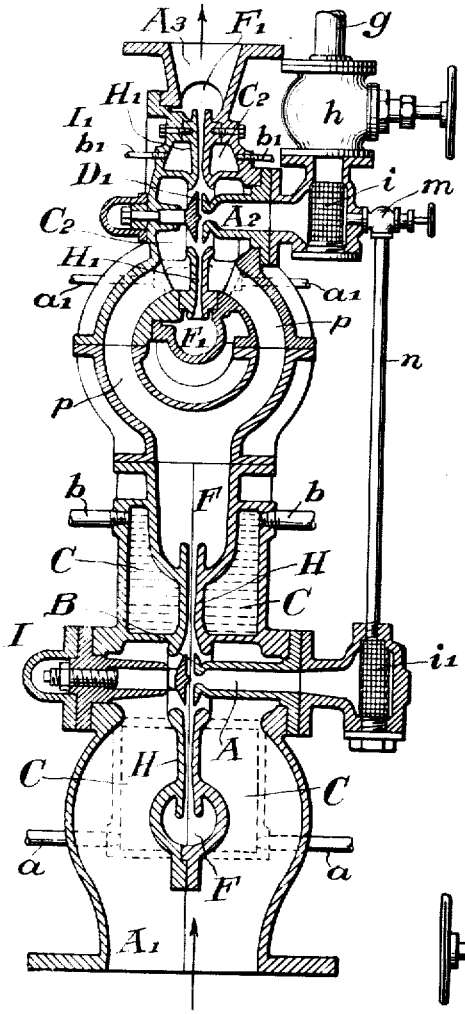
Figure 1 is a vertical sectional view, some parts in elevation, taken through a double stage ejector apparatus.

Referring to Fig. 1, I is the first stage ejector and $I_1$ the second stage ejector, each of the type disclosed in Letters Patent No. 1,282,595 October 22, 1918. The air, gas or vapor to be raised in pressure, as for example, withdrawn from a steam condenser or from any other suitable receptacle, is admitted through the passage $A_1$ which communicates with the space between the annular expansion nozzle B and the associated annular diffuser H. Steam is delivered from a suitable source, as a steam boiler, through the pipe *g*, and is admitted through the valve *h* through the strainer *i*, and valve *m* to the pipe *n*, which delivers through the strainer $i_1$ into the passage A, from which it passes through the throat of the nozzle B and is expanded by the nozzle B.

Two annular chambers C are provided, each having a side or cheek of the diffuser H as a part of its wall. With each chamber C communicate two water or other cooling liquid connections *a* and *b*, the connections *a* being employed to conduct the cooling liquid into the chamber C, and the connections *b* to conduct it away therefrom. If, however, the apparatus is employed in a position which is inverted with respect to that shown in Fig. 1, the cooling liquid will be admitted into the chambers C by the connections *b* and withdrawn therefrom through the connections *a*, it being preferable to admit the cooling liquid at the bottom of the chambers and withdraw it from the top.

The mixture of motive and entrained fluids is delivered by the first stage ejector I through its discharge casing F and through the passages *p* to the second stage ejector $I_1$, comprising the expansion nozzle $B_1$ and the diffuser $H_1$, the latter delivering into the discharge casing $F_1$, which delivers through the passage $A_3$ to atmosphere or any other pressure. Steam is admitted to the nozzle $B_1$ through the strainer *i* and the passage $A_2$.

The operation is as follows:

In the first stage the steam passing through the nozzle B is expanded and entrains the vapor or gas which enters through the passage $A_1$, and the mixture of motive and entrained fluids is then compressed in the diffuser H and while undergoing compression tend to rise or increase in temperature. This is more or less completely prevented by extracting heat from the mixture through the cheeks or walls of the diffuser H into the cooling liquid in the chamber C, such cooling liquid continuously circulating therethrough, cold liquid continuously entering, and warmed liquid continuously leaving. This cooling effect requires less expenditure of energy to entrain the vapor or gas entering at $A_1$, and to raise it in pressure to the pressure existing in the discharge casing F and passages *p*, with the result that the amount of steam delivered to the nozzle B through the pipe *n* is correspondingly diminished.

Furthermore, due to the cooler condition of the mixture of motive and entrained fluids, they pass with less frictional losses through the discharge casing F and the passages *p* into the second stage ejector $I_1$. In the second stage ejector, by action similar to that previously described, the mixtures are raised in pressure to atmospheric pressure or any other desired pressure. And because of the cooling of the mixture from the first stage, its density or weight per unit volume is greater, with the result that less steam is required in the nozzle $B_1$ to raise the mixture to atmospheric pressure, or any other desired pressure. It readily will be understood that cooling liquid chambers, like C, C of the first stage, may also be applied to the second stage around the diffuser $H_1$. In such case the cooling liquid more or less completely prevents rise in temperature due to the compression in the diffuser $H_1$, and therefore requires less energy to raise the entrained gas to atmospheric or other desired pressure, with resultant further decrease in steam consumption in the nozzle $B_1$.

Figure 2:
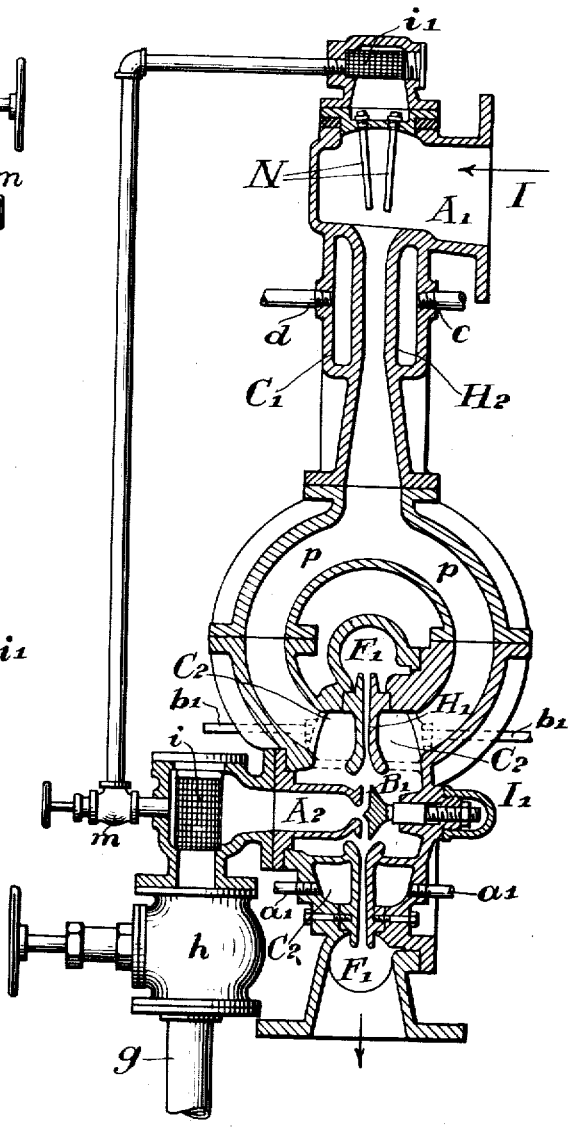
Fig. 2 is a vertical sectional view, some parts in elevation, through a double stage ejector apparatus in which in one stage a different type of ejector is used from that in the other.

In Fig. 2 the ejector of the first stage I is of a well known type involving any suitable number of expansion nozzles N which receive their steam through the pipe *n* and strainer $i_1$. With these nozzles is associated the tubular diffuser $H_2$, more or less of the length of which is surrounded by the chamber $C_1$, through which cooling liquid is circulated through the pipe connections *c* and *d*. The diffuser $H_2$ delivers through the passages *p* to the second stage ejector $I_1$, which is shown as of a type similar to those employed in Fig. 1, and having the diffuser $H_1$, expansion nozzle $B_1$, and discharge casing $F_1$, steam being supplied to the nozzle $B_1$ through the passage $A_2$.

Here again the fluid to be compressed is admitted through the passage $A_1$ and is entrained by the steam jets issuing from the nozzles N, and the mixture of motive and entrained fluids are compressed in the diffuser $H_2$. The cooling liquid circulated through the chamber $C_1$ prevents more or less completely a rise in temperature of the mixture due to the compression, and the same is accordingly delivered in cooled condition through the passages *p* to the second stage ejector, where they are further raised in pressure as hereinbefore described.

Here again the effect is the same in that less steam will be required for the nozzles N; and the fact that the mixture delivered from the diffuser $H_2$ is cooler, and is therefore of higher density, insures less friction loss through the passages *p;* and it further requires, due to its higher density, less steam supply to the nozzle $B_1$.

Obviously the second stages of the ejectors in Figs. 1 and 2 may be provided with means for extracting heat from the diffuser walls. In the second stages of both figures are shown casings $C_2$, $C_2$, each having a side wall or cheek of the diffuser $H_1$ as a part of its wall. With each chamber $C_2$ communicate two cooling liquid conducting pipes $a_1$ and $b_1$, the pipes $a_1$ conducting the cooling liquid into the chambers and the pipes $b_1$ conducting the same away from the chambers.

The extent of the cooling herein referred to may vary within wide ranges, and may be so great in some instances as to actually condense the vapor, if any, in the mixture of motive fluid and entrained fluid while undergoing compression; or the cooling may be of lesser degree, to allow the vapors to remain in the vapor state; or such cooling may be of an intermediate degree wherein some of the vapor is condensed and remains suspended in the remainder of the uncondensed vapor or elastic fluid in the form of moisture.

It will be understood that my invention is not limited, except where specifically expressed in the claims, to the types and structures of ejectors herein disclosed, nor is it limited to the number of stages involved, but may be applied to ejectors of any type and any number of stages.

What I claim is:

1. The method of raising the pressure of elastic fluid, which consists in expanding an elastic motive fluid, entraining therein the elastic fluid whose pressure is to be increased, compressing the mixture of motive and entrained fluids by conversion of velocity into pressure, cooling said mixture while its velocity is so being converted into pressure, in a second stage expanding motive fluid, entraining therein said cooled compressed mixture, and compressing the resultant mixture by conversion of velocity into pressure.

2. The method of raising the pressure of elastic fluid, which consists in expanding an elastic motive fluid, entraining therein the elastic fluid whose pressure is to be increased, compressing the mixture of motive and entrained fluids in a thin sheet, and extracting heat from said mixture while undergoing compression.

3. The method of raising the pressure of elastic fluid, which consists in expanding an elastic motive fluid, entraining therein the elastic fluid whose pressure is to be increased, compressing the mixture of motive and entrained fluids by conversion of velocity into pressure, cooling the mixture of motive and entrained fluids while undergoing compression, and in a second stage expanding motive fluid, entraining therein the cooled entrained fluid from the first stage, and compressing to higher pressure the mixture of said motive fluid and cooled entrained fluid from the first stage by conversion of velocity into pressure.

4. The method of raising the pressure of elastic fluid, which consists in expanding an elastic motive fluid, entraining therein the elastic fluid whose pressure is to be increased, compressing the mixture of motive and entrained fluids by conversion of velocity into pressure, cooling the mixture of motive and entrained fluids while undergoing compression, and in a second stage expanding motive fluid, entraining therein the cooled entrained fluid from the first stage, compressing to higher pressure the mixture of said motive fluid and cooled entrained fluid from the first stage by conversion of velocity into pressure, and while undergoing compression cooling said last named mixture.

5. In ejector apparatus, the combination with a nozzle for expanding motive fluid in a thin sheet or disk, of means for conducting elastic fluid to be compressed to contact with said motive fluid, an alined diffuser having a narrow passage through which the fluid passes in a thin sheet, and means for extracting heat from the walls of said diffuser.

6. In ejector apparatus, the combination with a nozzle for expanding motive fluid in a thin sheet or disk, of means for conducting elastic fluid to be compressed to contact with said motive fluid, an alined diffuser having a narrow passage through which the fluid passes in a thin sheet, and means for jacketing said diffuser with cooling fluid.

7. In multi-stage ejector apparatus, the combination with nozzle structure for expanding elastic motive fluid, means for conducting elastic fluid to be compressed to contact with the motive fluid issuing from said nozzle structure, a diffuser, means for extracting heat from the mixture of said fluids, a second stage nozzle structure for expanding elastic motive fluid, means for conducting cooled compressed fluid from the first stage to contact with the motive fluid issuing from said second stage nozzle structure, and a diffuser in which the second stage mixture loses velocity and gains in pressure.

8. In multi-stage ejector apparatus, the combination with nozzle structure for expanding elastic motive fluid, means for conducting elastic fluid to be compressed to contact with the motive fluid issuing from said nozzle structure, a diffuser, means for extracting heat from the mixture of said fluids, a second stage nozzle structure for expanding elastic motive fluid, means for conducting cooled compressed fluid from the first stage to contact with the motive fluid issuing from said second stage nozzle structure, a diffuser in which the second stage mixture loses velocity and gains in pressure, and means for extracting heat from the mixture while in the second stage diffuser.

9. In multi-stage ejector apparatus, the combination with nozzle structure for expanding elastic motive fluid, means for conducting elastic fluid to be compressed to contact with the motive fluid issuing from said nozzle structure, a diffuser structure, means for extracting heat from the mixture of said fluids while undergoing compression in said diffuser, a second stage nozzle structure for expanding elastic motive fluid, means for conducting cooled compressed fluid from the first stage to contact with the motive fluid issuing from said second stage nozzle structure, and diffuser structure in which the second stage mixture loses velocity and gains in pressure.

10. A single stage ejector for increasing the pressure of elastic fluid from a pressure below atmospheric pressure to a higher pressure comprising divergent nozzle structure whose outlet area is materially greater than its throat area for expanding elastic motive fluid into a high velocity jet, a chamber in which said jet entrains the elastic fluid to be compressed while at a pressure below atmospheric pressure, a diffuser having a convergent section adjacent said nozzle structure followed by a section of substantially constant cross section, and means external to said diffuser for cooling a wall thereof at said convergent section.

11. A single stage ejector for increasing the pressure of elastic fluid from a pressure below atmospheric pressure to a higher pressure comprising divergent nozzle structure whose outlet area is materially greater than its throat area for expanding elastic motive fluid into a high velocity jet, a chamber in which said jet entrains the elastic fluid to be compressed while at a pressure below atmospheric pressure, a diffuser having a convergent section adjacent said nozzle structure followed by a section of substantially constant cross section, and means external to said diffuser for cooling the wall thereof at said convergent section and said section of substantially constant cross section.

12. Ejector apparatus for compressing elastic fluid from a pressure below atmospheric pressure to a higher pressure comprising divergent nozzle structure whose outlet area is materially greater than its throat area for expanding elastic motive fluid into a high velocity jet, a co-operating diffuser structure forming a passage through which the mixture of motive and entrained fluids passes, a discharge chamber receiving said mixture from said diffuser structure, and means for extracting heat from said mixture while in said diffuser passage and while in said chamber.

13. Ejector apparatus comprising nozzle structure, co-operating diffuser structure forming a diffuser passage through which the mixture of motive and entrained fluids passes in the form of a thin sheet, and means for extracting heat from opposite sides of said mixture sheet.

14. Ejector apparatus comprising nozzle structure, co-operating diffuser structure forming a narrow diffuser passage through which the mixture of motive and entrained fluids passes in a thin mass, and a cooling jacket containing cooling medium extracting heat from opposite sides of said mass.

In testimony whereof I have hereunto affixed my signature this 14″ day of February, 1921.

ROBERT SUCZEK.

Certificate of Correction.

It is hereby certified that in Reissue Letters Patent No. 16,156, granted September 1, 1925, upon the application of Robert Suczek, of Philadelphia, Pennsylvania, for an improvement in "Methods of and Apparatus for Compressing Fluid," an error appears in the printed specification requiring correction as follows: Page 1, lines 80 and 81, strike out the words "or immediately thereafter, or both,"; and that the said Letters Patent should be read with this correction therein that the same may conform to the record of the case in the Patent Office.

Signed and sealed this 17th day of November, A. D. 1925.

[SEAL.]

WM. A. KINNAN,
*Acting Commissioner of Patents.*